(12) United States Patent
Fallourd

(10) Patent No.: US 11,367,913 B2
(45) Date of Patent: Jun. 21, 2022

(54) BATTERY ASSEMBLY

(71) Applicant: STMICROELECTRONICS (TOURS) SAS, Tours (FR)

(72) Inventor: Ludovic Fallourd, Louans (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 203 days.

(21) Appl. No.: 16/270,282

(22) Filed: Feb. 7, 2019

(65) Prior Publication Data

US 2019/0252649 A1 Aug. 15, 2019

(30) Foreign Application Priority Data

Feb. 14, 2018 (FR) ...................................... 1851242

(51) Int. Cl.
| | |
|---|---|
| H01M 50/116 | (2021.01) |
| H01M 6/40 | (2006.01) |
| H01M 10/04 | (2006.01) |
| H01M 10/0585 | (2010.01) |
| H01M 50/10 | (2021.01) |
| H01M 50/124 | (2021.01) |
| H01M 50/209 | (2021.01) |
| H01M 10/052 | (2010.01) |

(52) U.S. Cl.
CPC .......... *H01M 50/116* (2021.01); *H01M 6/40* (2013.01); *H01M 10/0436* (2013.01); *H01M 10/0585* (2013.01); *H01M 50/10* (2021.01); *H01M 50/124* (2021.01); *H01M 50/209* (2021.01); *H01M 10/052* (2013.01); *H01M 2220/30* (2013.01)

(58) Field of Classification Search
CPC .......... H01M 10/0436; H01M 10/052; H01M 10/0585; H01M 2220/30; H01M 2/0207; H01M 2/026; H01M 2/0267; H01M 2/0275; H01M 2/0287; H01M 2/029; H01M 2/1066; H01M 6/40; Y02E 60/10
See application file for complete search history.

(56) References Cited

U.S. PATENT DOCUMENTS

| | | | |
|---|---|---|---|
| 10,020,540 B2 | 7/2018 | Shakespeare et al. | |
| 2006/0216586 A1 | 9/2006 | Tucholski | |
| 2009/0136839 A1* | 5/2009 | Kraznov | H01M 6/186 429/160 |
| 2011/0076550 A1* | 3/2011 | Liang | H01M 2/204 429/175 |

FOREIGN PATENT DOCUMENTS

| | | |
|---|---|---|
| EP | 2907190 A1 | 8/2015 |
| WO | 2014/062676 A1 | 4/2014 |

\* cited by examiner

*Primary Examiner* — Adam A Arciero
(74) *Attorney, Agent, or Firm* — Seed Intellectual Property Law Group LLP

(57) ABSTRACT

The disclosure concerns a battery assembly including two batteries having their active layers facing each other and sharing an encapsulation layer.

19 Claims, 3 Drawing Sheets

BATTERY ASSEMBLY

BACKGROUND

Technical Field

The present disclosure relates to batteries, and more particularly to assemblies of a plurality of batteries in parallel.

Description of the Related Art

Mobile electronic devices, such as cell phones, digital tablets, connected objects, etc., are being used more and more. Currently, a smart phone comprises many functionalities, other than calling and texting, such as for example a connection to the Internet and the use of geolocation data. The development and the addition of new functionalities to electronic devices increase their power needs.

It would thus be desirable to improve the batteries of mobile electronic devices.

BRIEF SUMMARY

One or more embodiments are directed to a battery assembly comprising two batteries having their active layers facing each other and sharing an encapsulation layer.

According to an embodiment, the encapsulation layer has a thickness smaller than 10 μm.

According to another embodiment, the encapsulation layer has a thickness smaller than 5 μm.

According to an embodiment, the intermediate layer is a multilayer.

According to an embodiment, the encapsulation layer comprises at least one layer made of a polymer.

According to an embodiment, the encapsulation layer comprises at least one layer made of an oxide.

According to an embodiment, the two batteries are electrically connected in parallel.

According to an embodiment, the two batteries are symmetrical with respect to each other.

Another embodiment provides a method of manufacturing a battery assembly.

According to an embodiment, the method comprises the successive steps of: forming two batteries by depositing stacks of active layers on substrates; depositing an encapsulation layer on one of the two batteries; and stacking the two batteries on the side of the active layers; and performing a polymerization anneal.

According to an embodiment, the encapsulation layer has a thickness smaller than 10 μm.

According to an embodiment, an encapsulation layer having a thickness smaller than 5 μm is deposited on each battery before their stacking.

According to an embodiment, the batteries are symmetrical with respect to each other.

The foregoing and other features and advantages will be discussed in detail in the following non-limiting description of specific embodiments in connection with the accompanying drawings.

DETAILED DESCRIPTION

Figure 1A:
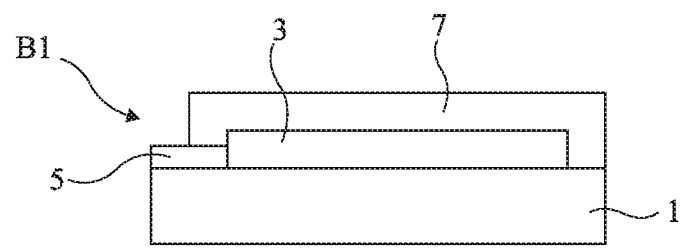
FIG. 1A is a cross-section view of a battery.

The same elements have been designated with the same reference numerals in the different drawings. For clarity, only those steps and elements which are useful to the understanding of the described embodiments have been shown and are detailed. In particular, the detail of the operation of a battery will not be developed.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the drawings. The terms "approximately", "substantially", and "in the order of" are used herein to designate a tolerance of plus or minus 10%, preferably of plus or minus 5%, of the value in question.

Term "layer" may designate a layer made of a single material or also a multilayer comprising a plurality of layers (laminated and/or deposited in a plurality of steps) of different materials stacked on one another.

Figure 1B:
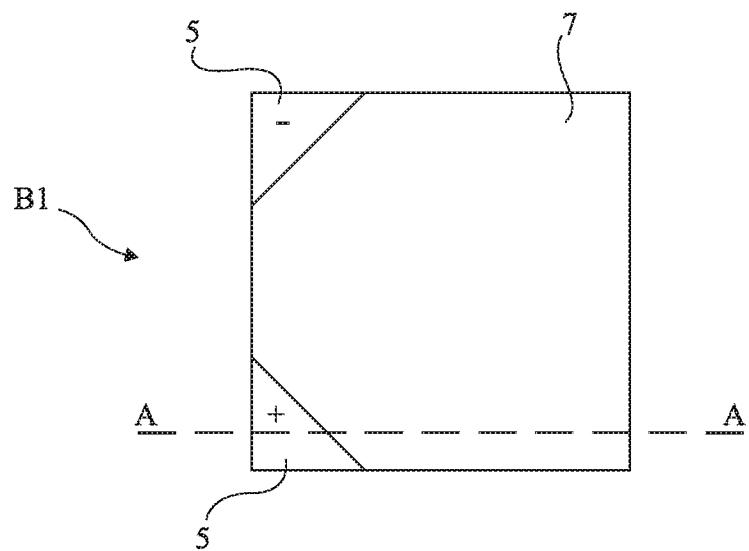
FIG. 1B is a top view of the battery of FIG. 1A.

FIGS. 1A and 1B are respective cross-section and top views of a planar battery, or microbattery, B1. FIG. 1A is a cross-section view along line AA of FIG. 1B.

As illustrated in FIG. 1A, battery B1 comprises, on a substrate 1, a stack of active layers 3, contacting metallizations or contacts 5, and an encapsulation layer 7. The stack of active layers 3 rests on a portion of the substrate 1. Contacts 5 rest on free portions of the substrate 1. One of the ends of stack 3 (the left-hand end in FIG. 1A) is in contact with one of the ends of contacts 5 (the right-hand end in FIG. 1A) for the electric connections to the outside. In other words, each contact 5 is in contact with a portion of the stack of active layers 3. Encapsulation layer 7 totally covers the stack of active layers 3. Encapsulation layer 7 further for example covers a portion of contacts 5.

Substrate 1 is for example a semiconductor substrate, for example, made of silicon. Substrate 1 for example has a thickness in the range from 20 μm to 60 μm, preferably in the order of 40 μm.

The stack of active layers 3 comprises at least a cathode layer, an electrolyte layer, and an anode layer (not shown). Stack 3 has a thickness for example in the range from 10 μm to 30 μm, for example, in the order of 15 μm or of 25 μm.

In the case of a lithium-ion type battery, stack 3 may be formed of a cathode made of a lithium compound such a lithium cobalt dioxide ($LiCoO_2$), of a lithium phosphate nitride (LiPON) electrolyte, and of a lithium anode.

Contacts 5 are formed by a conductive layer, for example, a metal, for example, copper or platinum, or a metal alloy. The metal layer has a thickness for example in the range from 0.3 to 1 μm, for example, in the order of 0.5 μm.

Encapsulation layer 7 is for example formed of an alternation of polymer layers and of oxide layers. The polymer layers are for example formed of an organic matrix made up of fillers having encapsulation properties and the oxide layers are for example made of aluminum oxide. Encapsulation layer 7 has a thickness for example in the range from 20 μm to 90 μm.

As illustrated in FIG. 1B, battery B1 has, in this arbitrary example, a square shape and comprises two contact metallizations 5, representing anode contact + and cathode contact − of battery B1. Since encapsulation layer 7 totally covers the stack of active layers 3, stack 3 is not visible in FIG. 1B. Contact metallizations (positive terminal) + and (negative terminal) − are for example positioned on the side of battery B1, for example, on two corners of battery B1. Contact metallizations + and − are for example triangular and have an apex corresponding to the corner of battery B1.

Wireless electronic devices are generally powered by one or a plurality of interconnected batteries, in parallel or in series. Such batteries are characterized by their power density, which corresponds to the quantity of electric energy that can be output relative to their volume. In the field of mobile electronic devices, for which the bulk is generally small, there is a need for batteries having a better power density.

In the case where battery B1 is a square battery having a side length in the order of 2.54 cm, of lithium-ion type comprising a cathode region having a thickness in the order of 15 μm, battery B1 has a volume power density in the order of 125 Wh/l (watt·hour/liter).

In the case where battery B1 is a square battery having a side length in the order of 2.54 cm, of lithium-ion type comprising a cathode region having a thickness in the order of 25 μm, battery B1 has a volume power density in the order of 188 Wh/l.

Figure 2:
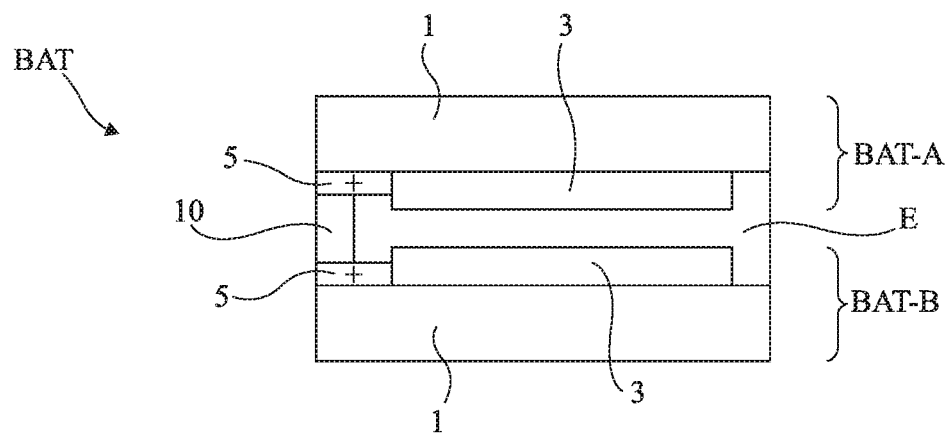
FIG. 2 is a cross-section view of an embodiment of a battery assembly.

FIG. 2 is a cross-section view of an embodiment of a battery assembly BAT comprising two batteries BAT-A and BAT-B sharing a single encapsulation layer E. Batteries BAT-A and BAT B are stacked and have their stacks of active layers facing each other.

Each battery BAT-A, BAT-B is a battery comprising the same elements (bearing the same reference numerals) as the elements of battery B1 described in relation with FIGS. 1A and 1B, but for the encapsulation layer 7 of each battery, which is replaced with common or shared encapsulation layer E. Encapsulation layer E has a thickness for example in the range from 3 to 10 μm, for example, in the order of 5 μm. Batteries BAT A and BAT-B are further connected in parallel. The anode and cathode contact metallizations of battery BAT-A are inverted with respect to the anode and cathode contact metallizations of battery BAT-B. Thus, the anode contact of battery BAT-A and the anode contact of battery BAT-B are positioned one above the other, and are connected by means of a conductive through via 10 or of a lateral contact. Similarly, the cathode contact of battery BAT-A and the cathode contact of battery BAT-B are positioned one above the other, and are connected by means of a conductive through via or of a lateral contact (not shown in FIG. 2).

Figure 3A:
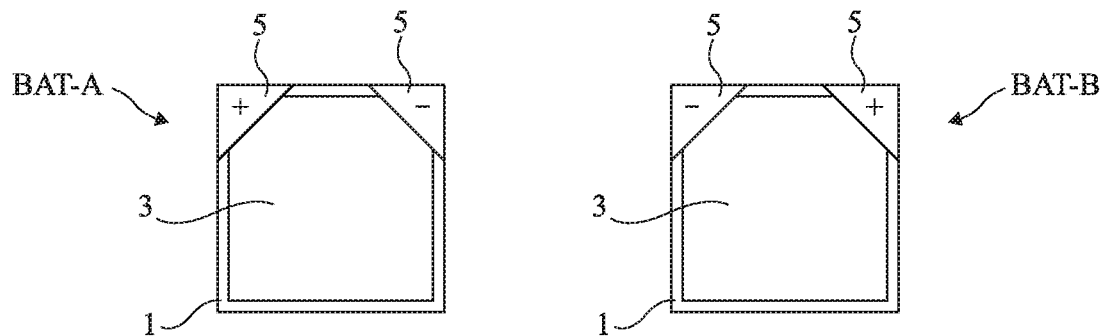
FIGS. 3A to 3C illustrate steps of an embodiment of a method of manufacturing the battery assembly of FIG. 2.
Figure 3B:
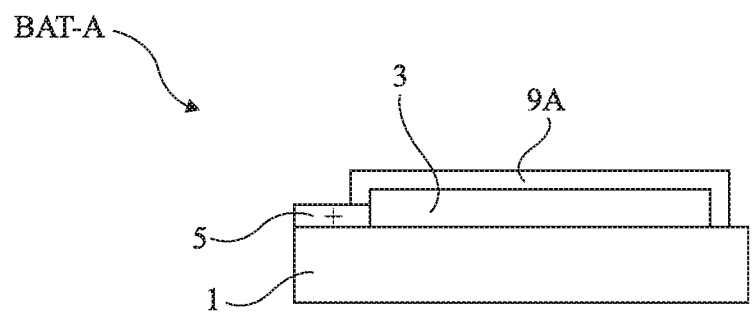
Figure 3C:
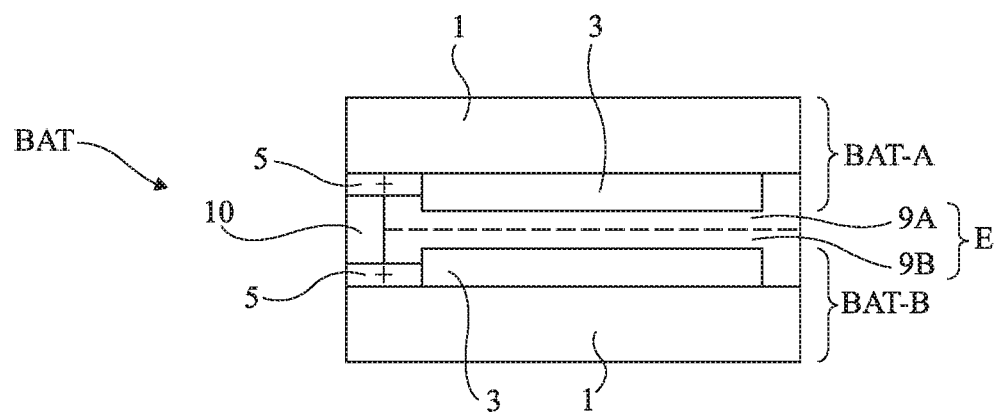

FIGS. 3A to 3C illustrate steps of an embodiment of a method of manufacturing an embodiment of a battery assembly described in relation with FIG. 2. FIG. 3A is a top view of each battery BAT-A, BAT-B taken separately. FIGS. 3B and 3C are cross-section views, respectively of batteries BAT-A and BAT-B and of a battery BAT.

At the step of FIG. 3A, the two batteries BAT-A and BAT-B are formed with no encapsulation layer. Batteries BAT-A and BAT-B have been shown as being square-shaped, but they may as a variation be rectangular, oval, round or have any other shape. Similarly, contact metallizations 5 are, in this example, arranged on the edge of the battery but they may more generally be arranged at any location of the surface. Contact metallizations + and − may have any shape.

Batteries BAT-A and BAT-B are symmetrical in top view. More particularly, the shape of the batteries is symmetrical and the + and − contacts of battery BAT-A are inverted with respect to the + and − contacts of battery BAT-B.

At the step of FIG. 3B, an encapsulation layers 9A and 9B are deposited on battery BAT-A and BAT-B, respectively (only battery BAT-A is shown in FIG. 3B). Layer 9A, respectively 9B, totally covers the stack of active layer 3 and possibly covers a portion of metal layers 5. Encapsulation layer 9A, respectively 9B, is for example formed of an alternation of polymer layers and of oxide layers. The polymer layers are for example formed of an organic matrix made up of fillers having encapsulation properties and the oxide layers are for example made of aluminum oxide. Encapsulation layer 9A, respectively 9B, has a thickness for example in the range from 1 to 5 μm, for example, in the order of 2.5 μm.

At the step of FIG. 3C, battery BAT-A is arranged on battery BAT-B to form the battery assembly BAT of FIG. 2. The formed battery assembly is submitted to a polymerization step enabling the two encapsulation layers 9A and 9B to bond to each other and to form single encapsulation layer E.

As shown in FIG. 3C, encapsulation layers 9A and 9B may be thickened at the periphery of active layer stack 3.

An encapsulation layer has, among others, a role of mechanical protection, of electric insulation, and of protection of the active layers against the environment (particularly against humidity, oxygen, nitrogen, etc.), which conditions its thickness.

According to the described embodiments, the function of mechanical protection, of electric insulation, and of protection against the environment of battery assembly BAT is now ensured on the upper surface and on the lower surface by the substrates 1 of each battery BAT-A, BAT-B. Common encapsulation layer E then only needs to play a role of protection of the periphery of assembly BAT. Its thickness can thus be decreased with respect to the thickness of the encapsulation layer of a battery of the type in FIGS. 1A and 1B. Thus, battery assembly BAT has a smaller volume relative to its active layer volume than a battery of the type in FIGS. 1A and 1B or than two interconnected batteries of the type in FIGS. 1A and 1B, and thus a better volume power density.

In the case where battery assembly BAT is formed of two square batteries BAT-A and BAT-B having a side length in the order of 2.54 cm, and of lithium-ion type comprising a cathode region having a thickness in the order of 15 μm, the battery assembly has a volume power density in the order of 180 Wh/l.

In the case where battery assembly BAT is formed of two square batteries BAT-A and BAT-B having a side length in the order of 2.54 cm, and of lithium-ion type comprising a cathode region having a thickness in the order of 25 μm, the battery assembly has a volume power density in the order of 260 Wh/l.

An alternative embodiment of the manufacturing method illustrated in relation with FIGS. 3A to 3C is to deposit encapsulation layer E directly on one of batteries BAT-A or BAT B, ending with a polymer layer, and then to place the other battery on the first battery, before the polymerization and the hardening of the final polymer layer.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A battery assembly comprising:
a first battery having a first set of active layers, a first anode contact, and a first cathode contact, the first anode contact extending to adjacent sides of the first battery, the first cathode contact extending to adjacent sides of the first battery;
a second battery having a second set of active layers, a second anode contact, and a second cathode contact, the second anode contact extending to adjacent sides of the second battery, the second cathode contact extending to adjacent sides of the second battery, the first set of active layers of the first battery facing the second set of active layers;
a first lateral contact coupling the first anode contact of the first battery to the second anode contact of the second battery;
a second lateral contact coupling the first cathode contact of the first battery to the second cathode contact of the second battery; one or more encapsulation layers covering the first set of active layers; and
one or more encapsulation layers covering the second set of active layers, wherein the one or more encapsulation layers covering the first set of active layers is directly bonded to the one or more encapsulation layers covering the second set of active layers, wherein the lateral contact abuts surfaces of the one more encapsulation layers covering the first set of active layers and the one or more encapsulation layers covering the second set of active layers.

2. The battery assembly of claim 1, wherein the one or more encapsulation layers covering the first set of active layers and the one or more encapsulation layers covering the second set of active layers have a total thickness that is less than 10 µm.

3. The assembly of claim 1, wherein the one or more encapsulation layers covering the first set of active layers and the one or more encapsulation layers covering the second set of active layers have a total thickness that is less than 5 µm.

4. The assembly of claim 1, wherein the one or more encapsulation layers completely cover the first set of active layers, and wherein the one or more encapsulation layers completely cover the second set of active layers.

5. The assembly of claim 1, wherein the one or more encapsulation layers covering the first set of active layers and the one or more encapsulation layers covering the second set of active layers are made of a polymer.

6. The assembly of claim 1, wherein the one or more encapsulation layers covering the first set of active layers and the one or more encapsulation layers covering the second set of active layers comprise at least one layer made of an oxide.

7. The assembly of claim 1, wherein the first and second batteries are electrically coupled together in parallel.

8. The assembly of claim 1, wherein the first and second batteries are symmetrically arranged with respect to each other.

9. A battery assembly comprising:
a first battery having a first set of active layers stacked on a first substrate, wherein the first battery includes a first anode contact and a first cathode contact, wherein the first anode contact extends to adjacent sides of the first battery, wherein the first cathode contact extends to adjacent sides of the first battery;
a second battery having a second set of active layers stacked on a second substrate, the first and second batteries being arranged so that the second set of active layers faces the first set of active layers, wherein the second battery includes a second anode contact and a second cathode contact, wherein the second anode contact extends to adjacent sides of the second battery, and wherein the second cathode contact extends to adjacent sides of the second battery; and
a first encapsulation layer over the first set of active layers of the first battery;
a second encapsulation layer over the second sect of active layers of the second battery; and
one or more lateral contacts that electrically couple the first battery to the second battery, wherein the one or more lateral contact abut surfaces of the first and second encapsulation layers, wherein a surface of the first encapsulation layer directly abuts a surface of the second encapsulation layer.

10. The battery of claim 9, wherein the first and second substrates are made of semiconductor materials.

11. The battery of claim 9, wherein the first and second encapsulation layers include one or more polymer and oxide layers.

12. The battery of claim 9, wherein the first and second encapsulation layers are less than 10 µm.

13. The battery of claim 9, wherein the one or more lateral contacts are two lateral contacts, wherein the first and second batteries are electrically coupled together in parallel by two lateral contacts.

14. The battery of claim 9, wherein the first battery is symmetrically arranged with respect to the second battery.

15. The battery of claim 9, wherein the first and second sets of active layers include a cathode layer, an electrolyte layer, and an anode layer.

16. A method comprising:
forming a first battery, wherein forming the first battery includes forming a first anode contact and a first cathode contact, wherein the first anode contact extends to adjacent sides of the first battery, wherein the first cathode contact extends to adjacent sides of the first battery;
forming a second battery, wherein forming the second battery includes forming a second anode contact and a second cathode contact, wherein the second anode contact extends to adjacent sides of the second battery, and wherein the second cathode contact extends to adjacent sides of the second battery;
encapsulating the first battery in a first encapsulation layer;
encapsulating the second battery in a second encapsulation layer; and
coupling the first encapsulation layer directly to the second encapsulation layer to form a battery assembly, wherein the first battery is coupled to the second battery at a lateral contact, wherein the lateral contact abuts surfaces of the first and second encapsulation layers.

17. The method of claim 16, comprising:
forming the first and second batteries by depositing active layers on first and second substrates, respectively; and wherein coupling the first encapsulation layer directly to the second encapsulation layer includes performing a polymerization anneal.

18. The method of claim 16, wherein at least one of the first and second encapsulation layers has a thickness that is less than 10 µm.

19. The method of claim 16, wherein at least a portion of one of the first and second encapsulation layers has a thickness that is less than 5 µm.

* * * * *

UNITED STATES PATENT AND TRADEMARK OFFICE
CERTIFICATE OF CORRECTION

PATENT NO. : 11,367,913 B2
APPLICATION NO. : 16/270282
DATED : June 21, 2022
INVENTOR(S) : Ludovic Fallourd Page 1 of 1

It is certified that error appears in the above-identified patent and that said Letters Patent is hereby corrected as shown below:

In the Claims

Column 5, Claim 1, Line 36:
"one more" should read: --one or more--.

Column 6, Claim 9, Line 19:
"sect" should read: --set--.

Signed and Sealed this
Thirteenth Day of September, 2022

Katherine Kelly Vidal
*Director of the United States Patent and Trademark Office*